United States Patent [19]

LeDuc et al.

[11] 4,384,030

[45] May 17, 1983

[54] SEALANT FOR BATTERY CELLS

[75] Inventors: Kenneth C. LeDuc; Joseph P. Bellino, both of Gainesville, Fla.

[73] Assignee: General Electric Company, Gainesville, Fla.

[21] Appl. No.: 181,721

[22] Filed: Aug. 27, 1980

Related U.S. Application Data

[63] Continuation of Ser. No. 929,366, Jul. 13, 1978, abandoned.

[51] Int. Cl.³ .................... C08L 95/00; H01M 2/08
[52] U.S. Cl. ................................ 429/174; 106/278; 429/185
[58] Field of Search ................. 106/278; 429/174, 185

[56] References Cited

U.S. PATENT DOCUMENTS 3,068,312  12/1962  Daley et al. ......................... 429/174
3,068,313  12/1962  Daley .................................. 429/174
3,411,851  3/1969   Miller ................................. 106/278
3,856,474  12/1974  Pittman et al. .................. 208/11 LE

FOREIGN PATENT DOCUMENTS 156090  4/1954  Australia ............................ 429/185

OTHER PUBLICATIONS

Abraham, "Asphalts and Allied Substances", Sixth Edition, vol. 3, D. Van Westrand Company, Inc., New York, 1962, p. 366.

*Primary Examiner*—Allan Lieberman
*Attorney, Agent, or Firm*—Morgan, Finnegan, Pine, Foley & Lee

[57] ABSTRACT

An improved sealant for battery cells is disclosed. The new sealant is prepared by mixing trichloroethane with asphalt. This composition, is less flammable than known battery cell sealants and, when appiled to the seal ring of a battery cell, yields unexpected improvements in preventing leakage of electrolyte from the battery cell.

6 Claims, No Drawings

SEALANT FOR BATTERY CELLS

This is a continuation of application Ser. No. 929,366 filed July 3, 1978, and now abandoned.

BACKGROUND OF THE INVENTION

This invention relates to galvanic battery cells and more particularly to sealants applied to such cells in their manufacture to prevent the escape of electrolyte from the cells.

The problem of electrolyte leakage from battery cells is well known. In attempts to overcome this problem, various mechanical solutions have been proposed such as seal rings and gaskets (e.g. U.S. Pat. No. 3,068,312, issued to Daley et al shows a seal ring and U.S. Pat. No. 3,068,313, also issued to Daley et al shows a seal gasket).

Typically, such seal rings have been coated with a dielectric material. As those skilled in the art are aware, the coating should be soft enough to deform so as to fill the imperfections or gaps between the cell container and the sealing ring or gasket, thereby shutting off all significant leakage of electrolyte.

Prior to the present invention, a common battery sealant consisted of a mixture of three parts (by volume) of naphtha solvent and one part (by volume) of Pioneer asphalt paint. Such a sealant has been commercially marketed by the Pioneer Division of the Witco Chemical Company of Perth Amboy, New Jersey. The Pioneer asphalt paint has been marketed under the name Pioneer 609 paint and is in accordance with Federal Specification MIL-C-450B Type II; TT-C-494 Type II.

The naphtha in the sealant provided by Pioneer meets the specifications of Federal Specification TT-N-95B Type I.

Although the Pioneer 609/naphtha solution has functioned adequately in battery cells to prevent the leakage of electrolyte, its application has involved problems because of the flammability of the solution.

It is therefore an object of this invention to provide a battery cell sealant which prevents electrolyte leakage but which is less flammable than sealants containing naphtha.

It is a further object of this invention to provide a battery sealant of low flammability which has unexpectedly improved sealing characteristics.

THE PREFERRED EMBODIMENT OF THE PRESENT INVENTION

In its preferred embodiment the sealant of the present invention is a mixture of Pioneer 412L asphalt paint (available from the Pioneer Division of the Witco Chemical Company) and one-one-one trichloroethane, $C_2 Cl_3 H_3$, i.e.

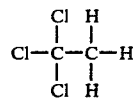

Preferably, the new sealant is batch mixed by adding 5 parts by volume of one-one-one trichloroethane, per Federal Specification O-T-620C (GSA-Federal Supply Schedule), to 1 part by volume of Pioneer 412 L asphalt paint in a container in an explosion proof hood. The mixture is stirred until thorough mixing has taken place.

Pioneer 412L hard asphalt is a proprietary name for a hard asphalt with the following properties:

| | |
|---|---|
| SOFTING POINT (RING & BALL) °F. | 240/250 |
| PENETRATION at 77° F./100 GR./5 SEC. dmm | 0-2 |
| PENETRATION at 32° F./200 GR./60 SEC. dmm | 0-1 |
| PENETRATION at 115° F./50 GR./5 SEC. dmm | 1-4 |
| SPECIFIC GRAVITY at 60° F. | 1.03-1.06 |
| SOLUBILITY IN $CS_2$ | 99.0+ |
| SOLUBILITY IN $CCl_4$ | 99.0+ |
| FLASH POINT (C.O.C.) °F. MIN | 600.0+ |
| WEIGHT/GAL LBS | 8.8 |

The primary function of the new sealant is to prevent leakage of electrolyte from a battery cell such as a sealed nickel cadmium cell. The sealant is applied to the seal ring of the cell. Because of the sealant's relatively low flammability the danger from sparks during automatic sealing applications is reduced.

EXAMPLE

Five pints of one-one-one trichloroethane per Federal Specification O-T-620C (GSA—FSS) was batch mixed with one pint of Pioneer 412L hard asphalt in a container in an explosion proof hood. The blend was stirred with a spatula until it was thoroughly mixed.

For comparison, a mixture of one pint of Pioneer 609 asphalt paint and three pints of naphtha solvent was prepared.

The two sealants were subjected to the following tests.

The outside edges of the seal rings of 12 sub-C alkaline battery cells and 11 D alkaline battery cells were coated with the Pioneer 412L/trichloroethane mixture. In addition, the outside edges of the seal rings of 12 sub-C cells and 12 D cells were coated with the Pioneer 609/naphtha mixture.

The sealed cells were then subjected to six temperature cycles in which the temperature was varied continuously from +160° F. to −40° F. Each cycle involved heating at 160° F. for 70 minutes continuously lowering the temperature for 60 minutes to −40° F., cooling at −40° F. for 60 minutes and then continuously raising the temperature to 160° F. over a period of 50 minutes. After this thermo cycle test, the battery cells were tested for leakage of electrolyte. This standard procedure involved spraying the cells with 0.1% phenolphthalein solution in the sealing area. If the sprayed phenolphthalein turned red, leakage of electrolyte was indicated; if the sprayed phenolphthalein remained clear, no leakage was indicated. The thermo cycle was repeated two additional times for the same D cells and one additional time for the same sub-C cells. The results are set forth below.

| | % LEAKERS | | | |
|---|---|---|---|---|
| | D Cells | | Sub-C Cells | |
| #Cycles (−40° F. to 160° F.) | Sealant Containing $C_2 Cl_3 H_3$ | Sealant Containing Naphtha | Sealant Containing $C_2 Cl_3 H_3$ | Sealant Containing Naphtha |
| 6 | 18 | 75 | 77 | 83 |
| 6 | 27 | 66 | 85 | 92 |
| 6 | 55 | 75 | — | — |

Similarly prepared D and Sub-C cells, 30 each, were subjected to one cycle thermo tests which involved heating for 15 hours at a constant temperature and cooling for 8 hours at a constant temperature. Leakage of electrolyte was determined by the previously described method. The results of this second series of tests are presented below.

| | % LEAKERS | | | |
| | D Cells | | Sub-C Cells | |
| One Cycle | Sealant Containing $C_2Cl_3H_3$ | Sealant Containing Naphtha | Sealant Containing $C_2Cl_3H_3$ | Sealant Containing Naphtha |
| --- | --- | --- | --- | --- |
| −20° F.; +140° F. | 7 | 13 | 0 | 0 |
| −30° F.; +160° F. | 3 | 53 | 7 | 27 |
| −40° F.; +162° F. | 7 | 77 | 33 | 40 |
| −50° F.; +187° F. | 33 | 63 | 37 | 47 |
| −60° F.; +187° F. | 57 | 67 | 60 | 60 |
| −70° F.; +213° F. | 80 | 77 | 100 | 100 |
| −20° F.; +140° F. | 28 | 70 | 86 | 93 |

What is claimed:

1. A sealant composition for use in battery cells to prevent electrolyte leakage and to reduce sealant flammability which consists essentially of a mixture of hard asphalt and trichloroethane in an approximate ratio of about 1:5 by volume.

2. The sealant composition of claim 1 wherein said trichloroethane is 1,1,1-trichloroethane.

3. In a process for the manufacture of a battery cell having a sealing ring between the cell container and closure member, the improvement which comprises applying to the surface of the sealing ring to form a coating thereon, a sealant composition which consists essentially of a mixture of hard asphalt and trichloroethane in an approximate ratio of about 1:5 by volume.

4. The process of claim 3 wherein said trichloroethane is 1,1,1-trichloroethane.

5. In a battery cell having a sealing ring between the cell container and closure member, the improvement which comprises employing a sealing ring having coated on its surface a sealant composition consisting essentially of a mixture of hard asphalt and trichloroethane in an approximate ratio of about 1:5 by volume.

6. The battery cell of claim 5 wherein said trichloroethane is 1,1,1-trichloroethane.

* * * * *